United States Patent [19]

Kindt et al.

[11] Patent Number: 5,034,160

[45] Date of Patent: Jul. 23, 1991

[54] SPRAYABLE FIREPROOFING COMPOSITION

[75] Inventors: Lawrence J. Kindt, Woodbine; James M. Gaidis, Ellicott City; Joseph M. Daly, Columbia, all of Md.

[73] Assignee: W.R. Grace & Co.-Conn., New York, N.Y.

[21] Appl. No.: 535,634

[22] Filed: Jun. 11, 1990

[51] Int. Cl.$^5$ .............................................. C09K 21/00
[52] U.S. Cl. .................................... 252/604; 252/610; 252/611; 252/606; 106/665; 106/680; 106/18.12; 427/255; 52/741
[58] Field of Search ............... 252/610, 604, 611, 606; 427/255; 106/680, 665, 18.12; 52/741

[56] References Cited

U.S. PATENT DOCUMENTS

| | | | |
|---|---|---|---|
| 4,159,302 | 6/1979 | Greve et al. | 264/333 |
| 4,293,341 | 10/1981 | Dudley et al. | 106/88 |
| 4,664,707 | 5/1987 | Wilson et al. | 106/18.11 |
| 4,673,697 | 6/1987 | Rowley | 523/218 |
| 4,683,019 | 7/1987 | Motoki | 156/293 |
| 4,699,822 | 10/1987 | Shu | 428/198 |
| 4,722,866 | 2/1988 | Wilson | 428/411.1 |
| 4,900,359 | 2/1990 | Gelbman | 106/86 |
| 4,963,191 | 10/1990 | LaFleur | 106/698 |

Primary Examiner—Robert L. Stoll
Assistant Examiner—N. Bhat
Attorney, Agent, or Firm—Howard J. Troffkin

[57] ABSTRACT

A sprayable fireproofing composition comprising a hydratable cementitious binder, a porous aggregate, a fibrous material, an air-entraining agent and a rheopectic agent selected from granular attapulgite, sepiolite or mixture thereof having a major amount of particulate greater than 40 microns and water content less than 16 percent.

18 Claims, No Drawings

SPRAYABLE FIREPROOFING COMPOSITION

BACKGROUND OF THE INVENTION

1. Field of the Invention

The subject invention is directed to coating compositions which are applicable in the field of construction materials. The invention is particularly applicable to the field of high-rise construction based on steel infrastructure where it is desired to provide fireproofing and/or acoustical insulation.

2. Description of the Related Art

Thick coatings of inorganic materials have been commonly applied in the course of the erection of steel structures designed to serve as multi-story building infrastructure primarily to serve in a fireproofing capacity, as well as to function as acoustic insulation agents. In the event of a major fire in a section or on one or more floors of a building, it has been found that such coatings substantially inhibit thermal weakening of the steel infrastructure and, thus, prevent a catastrophic collapse of the building.

In order to be suitable for such use, coating mixes, both in the wet and dry state, must possess a number of crucial properties. They must be able to hold the large quantity of water that renders them capable of being pumped easily and to great heights. Although high water content is desired, the aqueous dispersion must retain a consistency sufficient to prevent segregation or settling of ingredients and permit adequate "yield" or uniform coverage on the steel surface at a given thickness. Furthermore, the coating mixtures must obviously be capable of adhering to steel surfaces, both in the slurried state and upon drying. Finally, the mixtures must set without any undue expansion or shrinkage which could result in the formation of cracks that would seriously detract from the insulating value of the dry coating. This complex balance of properties has substantially been achieved heretofore by gypsum-vermiculite systems containing cellulosic fiber. Examples of compositions of this general type are described by Bragg in U.S. Pat. Nos. 3,719,573 and 3,839,059. However, vermiculite as a naturally occurring mineral is subject to variations in quality, uniformity and consistency.

In order to overcome the deficiencies encountered with vermiculite-based mixtures, compositions containing synthetic and natural organic particulate material have been suggested (See U.S. Pat. No. 4,751,024). Due to the hydrophobic nature of the organic material, the composition's properties are very sensitive to the water content used in forming the sprayable mix. Thus, when a low water content is used, it is difficult to form a uniform fluid mixture which is capable of being readily pumped to the desired point of application. When the water content is increased to achieve a mixture of lower viscosity (and thus readily mixable and pumpable), the resultant mixture exhibits a high flow at the point of application and, thus, does not readily maintain its shape and adhere to the infrastructural surface. Such formulations may fall off at the surface and, thereby, lose the advantages achievable by the coating.

Various agents are known to thicken formulations e.g. polyethylene oxide, xanthan gum, carboxymethyl cellulose guar gum, hydroxypropyl guar gum. Although such agents may provide a less fluid composition at the point of application and thereby aid in initial adhesion, they are not desirable for the instant application as they impair the ability of providing a uniform initial mix and require more energy (larger pumps) to force the fluid through the conduit to the point of application. Further, such thickeners, in many instances, do not impart good adhesion properties to compositions containing them.

Other agents are known to impart thixotropic properties to fluids. These agents include attapulgite and sepiolite clays which are conventionally provided as ultrafine colloidal material. For example, U.S. Pat. Nos. 3,986,969 and 4,801,395 describe the use of attapulgite as a thixotropic agent while JP 63-297256 teaches the use of sepiolite as a thixotropy-imparting agent for an inorganic adhesive spray composition. The use of thixotropic agents would detract from the instant formulation. They would provide high viscosity under the low shear mixing conditions. The formulator would not be able to provide a uniform composition or would be required to add excess water at the mixing stage which would cause a high flow coating to be applied.

It is highly desired to provide a fireproofing and acoustical dampening composition which, when initially mixed with water at the job site, exhibits low viscosity to allow the components to readily mix and form a uniform composition while being capable of exhibiting high viscosity and minimal flow at the point of application to thus maintain its shape and adherence to the applied structure.

SUMMARY OF THE INVENTION

The present invention is directed to enhanced fireproofing spray compositions which, when initially mixed with water, exhibit low viscosity while, after subjection to high shear, exhibit higher viscosity. The mixture is thus readily formed into an aqueous dispersion which, upon application, exhibits minimal flow and good adhesion to the structural substrate.

The composition comprises a hydratable cement binder, a porous aggregate, a fibrous material in combination with a magnesium silicate-based clay selected from attapulgite, sepiolite or mixtures thereof wherein the clay has a particle size distribution such that the average particle size is at least 74 microns and that at least 60 weight percent is of a particle size of at least 44 microns or larger.

DETAILED DESCRIPTION

For purposes of clarity, the following terms used in the present specification and appended claims are defined below:

The term "rheopectic" shall mean compositions which, when presented in a fluid state, are capable of exhibiting an increase in viscosity after application of shear forces to the fluid.

The term "thixotropic" shall refer to compositions which, when presented in a fluid state, are capable of exhibiting a decrease in viscosity upon application of shear forces to the fluid.

Rheopectic and thixotropic fluids are both classified as viscosity time-dependent-under-shear fluids but exhibit viscosity properties which are substantially opposite to each other.

The concentration of the components of the present composition are given herein in terms of parts by weight unless otherwise indicated.

The present invention is directed to a novel composition suitable for spray application onto steel infrastructures and other substructures of buildings to provide fireproofing and acoustical dampening. The subject compositions are capable of exhibiting a low initial viscosity (high fluidity) and, after subjection to high shear force, exhibiting a high viscosity. The compositions have unexpectedly been found to be capable of being readily mixed using conventional mixing apparatus without the concern for criticality of water to solid content (within conventional ranges) and to be capable of providing a product which exhibits a high yield coating which has the ability to adhere and maintain itself as a coating on the substructure surface.

The subject composition comprises a hydratable cementitious binder, a porous aggregate, an air-entraining agent, a fibrous material and a magnesium silicate-based clay selected from attapulgite, sepiolite or mixtures thereof composed of large particle size (diameter) material. In particular, the present invention is directed to fireproofing coating such as disclosed in U.S. Pat. Nos. 3,719,513, 3,839,059 (exfoliated vermiculite-based compositions) and 4,751,024 (polystyrene-based compositions) which have been enhanced and improved by the addition of the presently described magnesium silicate clay to impart rheopectic properties to the resultant composition. The teachings of U.S. Pat. Nos. 3,719,513; 3,839,059; and 4,751,024 are expressly incorporated herein by reference.

The present invention is a cementitious composition. It requires the use of from about 50 to 90 weight percent of a hydratable cementitious binder. Known Portland cements can be used as the binder. However, it is generally preferred to employ a hydratable gypsum binder (also known as gypsum plaster or plaster of paris) due to its advantageous fireproofing characteristics. The binder can be used in relatively low amounts, e.g. as little as 50 percent by weight. It is generally preferred to employ from about 50 to 70, preferably 50 to 60, weight percent binder when the aggregate is a relatively high density (e.g. 2–12 lbs/ft$^2$) aggregate (i.e. vermiculite or perlite or mixtures thereof). However, it is generally preferred to employ at least about 75 percent by weight based on the total weight of the composition, and more preferably at least about 85% by weight when the aggregate is a relatively low density aggregate (0.3–1 lb/ft$^2$) (i.e. polystyrene).

The porous aggregate of the present composition can be selected from vermiculite, perlite or shredded polystyrene (preferred). The aggregate is normally contained in the subject composition in a volume percent concentration of from about 3 to 40 with amounts of from about 3 to 20 volume percent being preferred. Low density aggregate is preferred as it provides a higher volume coating per unit weight of total composition. Preferably, the particle size at its maximum dimension is less than ¼ inch.

The vermiculite aggregate normally used is exfoliated (expanded) vermiculite of standard grade having a density of about 5–7 pounds per cu. foot. Prior fireproofing compositions formed with vermiculite as the porous particulate have exhibited characteristics which tend to vary from batch to batch due to the variations in this natural product. The incorporation of the presently described rheopectic agent overcomes such variations and thus, provides an improved composition.

Another useful aggregate material is perlite. This material is essentially an amorphous mineral composed of fused sodium potassium aluminum silicate. The mineral is conventionally ground and then expanded by heating to form particulate material having densities ranging from about 2 to 12 pounds per cubic foot. Preferred perlite aggregates are commercial grades of expanded perlite having a density of from 2 to 5 lbs/cu. ft.

The use of the subject rheopectic agents, as fully described herein below, is particularly useful in combination with perlite-containing compositions as such compositions tend to be too fluid at the point of application to provide good adhesion. The subject rheopectic agents provide a counteracting property which enhances conventional perlite compositions to achieve the desired properties both during mixing and at the point of application.

The preferred porous aggregate used in the present coating compositions is shredded polystyrene particles which can be produced by shredding loose expanded polystyrene beads or molded polystyrene beadboard. Extruded polystyrene can also be shredded to provide the aggregate material of this invention. A method and apparatus for shredding foamed polystyrene beads are disclosed in U.S. Pat. Nos. 3,627,211, and 3,686,068 the disclosure of which is expressly incorporated by reference herein. As disclosed in these patents, the shredded particles have irregularly shaped exterior surfaces, tears, and ragged edges. The shredding process opens a substantial number of the cells on the surface of the foamed beads, thereby allowing penetration of the cementitious binder into the cellular structure and integrating the binder and the particles. The density of the shredded polystyrene is preferably in the range of about 0.3 to 0.8 pounds per cubic foot, more preferably about 0.4 to 0.6 pcf.

The aggregate is contained in the subject composition to aid in providing a high yield coating. The amount of aggregate used (in terms of weight percent) will be, generally, directly proportional to the density of the aggregate. Thus, when the aggregate is exfoliated vermiculite (density of about 5–7 lbs/ft$^3$), the vermiculite is used in from about 20 to 40, preferably 30 to 40 weight percent of the composition. When shredded polystyrene is used (density of about 0.2 to 0.8 lbs/ft$^3$), this aggregate is used in from about 1 to 5, preferably about 1 to 3 weight percent of the composition. When perlite is the aggregate of the composition (density ranges from 2 to 12 lbs/ft$^3$), the perlite should be present in from about 5 to 40 weight percent. Low density perlite (2–5 lbs/ft$^3$) is normally present in from about 5 to 30 weight percent while high density perlite (7–12 lbs/ft$^3$), when used, is present in from about 20 to 40 weight percent. In general, the volume of aggregate contained in a 100 pounds of composition is from about 2 to 10 cubic feet, preferably from about 4 to 8 cubic feet.

The fibrous component of the present composition is normally provided by either organic fibrous material alone or in combination with inorganic fibrous material. Preferably, the organic fibrous material is a high wet bulking organic fiber, such as cellulose fibers described in U.S. Pat. Nos. 3,719,513 and 3,839,059. The inorganic fibers should be capable of providing reinforcement of the composition, and are preferably glass fibers. The total amount of fibrous component is from about 4 to 12 weight percent of the composition with the organic fibers being from about 4 to 10 weight percent and the inorganic fibers, when present, being present in from 0 to about 2 weight percent.

The foaming agents or air entraining agents that are used in the compositions of this invention are well-known in the cement art. Such well-known materials as sulfonated monoglycerides, sodium alkyl arylsulfonate, and sodium lauryl sulfate, can be used in appropriate quantities to provide a slurry of desired density and pumpability. Dry foaming agents can be incorporated into the dry composition before addition of water, while both dry and liquid agents can be added to the slurried composition. The air-entraining agent may be present in from 0.05 to about 0.5% by weight with from 0.1% to 0.5% by weight, preferred.

In addition to the above-described components, the subject compositions must contain certain specific material, as fully described below, to impart rheopectic properties to the aqueous dispersion of the composition. These materials are attapulgite, sepiolite and mixtures thereof which are of relatively large particle size.

Attapulgite or Attapulgus clay is an off-white or cream-colored needle-like crystal normally mined in Attapulgus, Ga., and parts of Florida. Sepiolite (meershaum) occurs in California, U.S.A. as well as in parts of Turkey, Spain, Greece and Morocco. In both instances, the mined material is dried to remove the free water. The dried product is initially broken into a tough, granulated "first cut" material which is then subjected to ball milling or the like to form very fine particulate powder. The resultant very fine powder (90% or greater amount has particle size of less than 44 microns) product is conventionally used as a thixotropic agent in paints, inks, adhesives and the like.

The attapulgite and sepiolite material found useful herein are the granular particles which have a particle size distribution such that at least 60 percent by weight (preferably at least 80 percent by weight) is of a particle size of at least 44 microns or greater (is retained on a No. 325 mesh screen of U.S. Standard Sieve Series). The average particle size should be at least 74 microns or greater, (retained on a No. 200 mesh sieve). When attapulgite is used, it is preferred that at least about 80 percent by weight of the attapulgite particles are at least 44 microns or larger. When sepiolite granular material is used, the particles can have a particle size distribution such that at least about 60% of the sepiolite particles are of 44 microns or larger. The subject attapulgite and sepiolite are obtainable as first cut material. Preferably, the particle size distribution has a major amount of material which is +100 mesh and most preferably +50 mesh (297 microns or greater). Particles greater than +10 mesh (2000 microns) are not desired.

It is preferable that the subject attapulgite and sepiolite have low moisture content. The lower the moisture content, the greater the ability the clay has to impart rheopectic properties to aqueous dispersions of the instant composition. The moisture content should be less than about 16%, with from about 4 to 16 percent being preferred and from about 4 to 10 percent being most preferred. The preferred clays are dried at low temperatures (50° to 250° F.) to reduce the moisture content.

The presently required attapulgite and sepiolite granular material has unexpectedly been found to cause the desired rheopectic property to be imparted to aqueous dispersions of the subject composition. In contrast, other clays such as bentonite, kaolin as well as fine particulate (normally less than 44 micron) attapulgite and sepiolite powders do not provide the desired property.

The subject composition should contain a sufficient amount of the above-described course particulate clay to impart rheopectic properties to the resultant aqueous dispersion. Minimal experimentation will determine the exact amount needed for a particular formulation. It is normally desirable to use from 3 to 20 weight percent, preferably from 3 to 10 weight percent of the granular attapulgite, sepiolite or mixture thereof to provide the enhanced formulation.

This unexpected ability to impart a shear-thickening behavior is highly desired and of extreme technological utility in the process of mixing and subsequent spray application of the subject formulations onto the infrastructure of buildings. It is most desirable that an aqueous composition exhibit relatively low viscosity at the low shear mixing stage but significantly higher viscosity subsequent to being subjected to high shear forces of the pump and spray apparatus. The subject compositions are capable of providing an aqueous dispersion which is not sensitive to normal deviations in water content, are readily mixed and pumped to the application site without segregation and which provide coatings of high yield, i.e. placement over a relatively large area, per weight of the dry composition, at a given thickness of application. Yield is generally calculated by methods known in the art as board feet per dry weight of composition. The particularly preferred compositions are capable of providing a high yield of at least about 20 board feet per 45 pounds by weight of the dry composition. Generally, a yield in the range of about 25 to 35 board feet per 45 pounds dry weight is obtained. The subject compositions also exhibit a low flow and are, therefore, capable of being applied to vertical surfaces without sagging, run-off, or fall-off. Instead, the subject compositions adhere to the applied substructure prior to set and after set.

In certain instances it is also desirable to incorporate into the mix a conventional (to the cement technology) water-retaining agent which allows more water to be incorporated into the slurry, thereby increasing yield, while retaining about the same level of adhesion to steel. A preferred water-retaining agent is hydroxypropylmethylcellulose.

The dry compositions of this invention are converted to pumpable slurries by addition of water. Generally, the water is added to the dry mix at the job site shortly before being pumped to the point of application. A water to cementitious binder ratio of about 1.2:1 to 2.5:1 is generally employed to provide a pumpable mixture of desired consistency and adhesiveness. Generally, a useful range of slurry density, which affords easy pumping, is about 35 to 55 pounds per cubic foot (pcf).

The compositions of the instant invention exhibit low viscosity when mixed with water under the low shear forces normally produced by conventional mixers (e.g. mortar mixers having paddle or spiral blade design or the like) to produce the coating composition at the construction or job site. When the resultant aqueous dispersion is subjected to high shear forces, such as is generated by piston pumps used to move and supply the aqueous composition to the site of application, the dispersion exhibits its rheopectic abilities and provides a high viscosity material. The high shear is provided by standard application pumps, such as a piston pump capable of pumping the subject composition at a rate of from about 1 to 2.5 $ft^3$/min. Each piston normally has a piston stroke of about 4 to 5 inches in a 3 inch bore with from 50 to 125 strokes per minute (SPM) per cylinder. The typical application setting is about 100 SPM which provides for a calculated volumetric output of about 1.5–2 cu.ft./min./cyl. The actual volumetric output may be only 25 to 50 percent of this due to the compressible nature of the fluid composition being moved and the amount of pumping pressure being generated.

The following examples are given for illustrative purposes only and are not meant to be a limitation on the appended claims. All parts and percentages are by weight unless otherwise indicated.

EXAMPLE I

A gypsum-based composition was prepared by dry mixing the following ingredients:

| Ingredient | wt. % |
|---|---|
| Gypsum Plaster | 82.5 |
| Shredded Expanded Polystyrene (0.375 pcf) | 2.9 |
| Cellulose fiber | 6.2 |
| Air-entraining agent (alpha-olefinsulfonate) (WITCONATE AOK) | 0.2 |
| Attapulgite granules (90+ % greater than 325 mesh U.S. Std.; Average Particle Size of 140 mesh) | 8.2 |

The granules had a distribution of 17% of +50 mesh; 39% of +100 mesh; 31% of +200 mesh; and 13% of +325 mesh.

The formed dry composition was mixed with water at a water/solids ratio of 1.4 using a ribbon blade mortar mixer to provide a substantially uniform dispersion. The dispersion was transported to a spray applicator using a Thompson A375 sprayer-pump of a cylinder-pump design which imparts high shear forces to the dispersion. The dispersion is carried through 200 foot hose at a pump pressure of 170 psi. The pumped slurry was applied to a 10-inch steel I-beam to provide an even coating of 0.75 inch thickness. Viscosity measurements were made of the dispersion after mixing, after subjection to the high shear forces of the spray pump and also of the sprayed material. The formed coating was observed 20 minutes after application to determine if the dispersion commenced to set and if any cracking, sagging or adhesion fault (material falls off) occurred. The results are shown below:

| Viscosity[1] | | | Observations | | | |
|---|---|---|---|---|---|---|
| Mixer | Pump | Sprayer | Set[2] | Cracking | Sagging | Adhesion |
| 27 | 21 | 16 | Yes | No | No | Yes |

[1]Done according to ASTM C-472 using Vicat Viscometer adapted for sanded plaster. Low numbers indicate high viscosity.
[2]Observation taken at 6 hours.

The components formed a dispersion of low viscosity in the mixer and thus was readily mixed to a uniform consistency. After subjection to the high shear forces of the pump the compositions's viscosity began to increase and became stiff after subjection to the spray-applicator. Thus, the dispersion exhibited a high degree of body which adhered well to the steel structure and did not crack or sag while setting to a dry uniform coating.

EXAMPLE II

A gypsum-based composition was prepared by dry mixing the following:

| Ingredients | wt. % |
|---|---|
| Gypsum Plaster | 69.2 |
| Perlite (3.9 pcf) | 13.9 |
| Shredded Expanded Polystyrene (0.375 pcf) | 1.8 |
| Cellulose fiber | 5.0 |
| Air-Entraining Agent (alpha olefin sulfonate) | 0.2 |
| Sepiolite granules (65% larger than 325 mesh U.S. Std. with average particle size of about 140 mesh) | 9.0 |

The dry composition was mixed, pumped, sprayed and applied in the same manner as described in Example I above except that the water/solids ratio was 1.45 and the pump pressure was 185 psi. Viscosity measurements and observations were done as described in Example I above. The results were:

| Vicat Viscosity | | | Observations | | | |
|---|---|---|---|---|---|---|
| Mixer | Pump | Sprayer | Set | Cracking | Sagging | Adhesion |
| 26 | 22 | 20 | Yes | No | No | Yes |

Again this composition formed a low-viscosity dispersion in the mixer. After subjection to the high-shear pump the viscosity increased and further increased upon application from the sprayer. The resultant high-viscosity dispersion adhered well to the steel beam and set without cracking or sagging.

A second composition was formed in the same manner as described above except that the sepiolite was not present. The initial composition had good viscosity in the mixer but, upon application, was too thin to remain on the steel beam, e.g. it exhibited sagging and poor adhesion.

EXAMPLE III

A dry gypsum-based composition was formed by dry mixing the following:

| Ingredients | wt. % |
|---|---|
| Gypsum plaster | 58.0 |
| Perlite (3.9 pcf) | 23.2 |
| Cellulose fiber | 10.3 |
| Air-entraining Agent (WITCONATE AOK) | 0.2 |
| Attapulgite granules (90% greater than 325 mesh U.S. Standard; Average Particle Size about 140 mesh | 8.3 |

The dry mixture was mixed with water (water/solid ratio of 1.7), pumped and spray-applied to a steel I-beam as described in Example I above. Vicat Viscosity measurements and observation of the formed coating were made as described in Example I above. The results are given below:

| Vicat Viscosity | | | Observations | | | |
|---|---|---|---|---|---|---|
| Mixer | Pump | Sprayer | Set | Cracking | Sagging | Adhesion |
| 20 | 20 | 18 | Yes | No | No | Yes |

The higher density aggregate used here required higher loading of aggregate and, therefore, a predictably more viscous initial dispersion. However, the material was readily mixable to a uniform dispersion which did exhibit the desired rheopectic properties after the pump and sprayer and thereby provided a coating having excellent properties.

EXAMPLE IV

The following example is given for comparative purposes only.

A dry gypsum-based composition was formed by dry mixing the following:

| Ingredients | wt. % |
|---|---|
| Gypsum plaster | 68.8 |
| Perlite (3.9 pcf) | 26.1 |
| Cellulose fibers | 4.9 |
| Air-entraining Agent (WITCONATE AOK) | 0.2 |

The dry mix was mixed with water (water/solid ratio of 1.4), pumped and spray-applied to a steel I-beam as described in Example 1 above. The following measurements and observations were made as described in Example I.

| Vicat Viscosity | | | Observations | | | |
|---|---|---|---|---|---|---|
| Mixer | Pump | Sprayer | Set | Cracking | Sagging | Adhesion |
| 20 | 32 | 27 | Yes | No | Yes | No |

The above example shows that when the subject clay rheopetic agent was not present, the composition was thicker (lower number is more viscous) in mixer (harder to mix) and still too thin at the point of application. The resultant coating showed excessive sagging and poor adhesion.

What is claimed:

1. A dry composition comprising a hydratable cement, porous aggregate particulate, a fibrous material, an air-entraining agent and a magnesium silicate-based clay selected from the group consisting of granular attapulgite, sepiolite or mixtures thereof which have a particle size distribution such that at least 60 weight percent is greater than 44 microns and the average particle size is at least 72 microns; said clay being present in an amount to impart, on addition of water, rheopectic properties to an aqueous dispersion of said composition.

2. The composition of claim 1 having from about 50 to 90 wt. percent cement, from about 3 to 40 vol. percent aggregate, from about 4 to 10 wt. percent organic fibrous material, from 0 to 2 wt. percent of an inorganic fibrous material, from about 0.05 to 0.5 wt. percent air-entraining agent and from about 3 to 20 wt. percent of said clay having a water content of less than about 16 wt. percent.

3. The composition of claim 1 wherein the porous aggregate is a polystyrene selected from the group consisting of shredded expanded polystyrene beads, shredded polystyrene beadboard, shredded extruded polystyrene or mixtures thereof.

4. The composition of claim 3 wherein the shredded polystyrene has a density of from about 0.2 to about 0.8 pcf and is present in from about 1 to 5 weight percent of said composition; and wherein the hydratable cement is gypsum and is present in at least about 75 weight percent of said composition.

5. The composition of claim 1 wherein the porous aggregate is an exfoliated vermiculite.

6. The composition of claim 5 wherein the exfoliated vermiculite has a density of from about 5 to about 7 pcf and is present in from about 20 to about 40 weight percent; and wherein the hydratable cement is a gypsum and is present in from about 50 to about 70 weight percent.

7. The composition of claim 1 wherein the porous aggregate is an expanded perlite having a density of from about 2 to about 12 pcf.

8. The composition of claim 7 wherein the expanded perlite has a density of from about 2 to about 5 pcf and is present in from about 5 to about 30 weight percent; and wherein the hydratable cement is gypsum and is present in from about 50 to about 70 weight percent.

9. The composition of claim 1, 2, 3, 4, 5, 6, 7 or 8 wherein the magnesium silicate-based clay is dried, granulated attapulgite clay wherein at least about 80 weight percent of said granulate has a particle size of at least 44 microns, has a water content of less than about 16 weight percent, and is present in from about 3 to about 10 weight percent in said composition.

10. The composition of claim 1, 2, 3, 4, 5, 6, 7 or 8 wherein the magnesium silicate-based clay is dried, granulated sepiolite clay wherein at least about 60 weight percent of said granulate has a particle size of at least 44 microns, has a water content of less than about 16 weight percent and is present in from about 3 to about 10 weight percent of said composition.

11. The composition of claim 1 having from about 1 to about 5 wt. percent of a shredded polystyrene; at least about 75 weight percent of a hydratable cement composed of hydratable gypsum plaster; fibrous material composed of from about 4 to 10 wt. percent of high wet bulking organic fibers, and from 0 to about 2 wt. percent glass fibers; from about 0.1 to about 0.5 wt. percent of the air-entraining agent; and from about 3 to about 10 wt. percent of the dried, granular magnesium silicate clay.

12. The composition of claim 1 having from about 20 to about 40 wt. percent of an exfoliated vermiculite; at least about 50 weight percent of the hydratable cement composed of a hydratable gypsum plaster; fibrous material composed of from about 4 to about 10 wt. percent of high wet bulking organic fibers, and 0 to 2 wt. percent of glass fibers; from about 0.1 to about 0.5 wt. percent of an air-entraining agent and from about 3 to about 10 wt. percent of a dried, granular magnesium silicate clay.

13. The composition of claim 1 having from about 5 to about 30 wt. percent of an expanded perlite (density of about 2-5 pcf); at least about 50 weight percent of hydratable cement composed of a hydratable gypsum plaster; fibrous material composed of from about 4 to about 15 wt. percent high wet bulking organic fibers, and 0 to about 2 wt. percent glass fibers; from about 0.1 to about 0.5 wt. percent of an air-entraining agent; and from about 3 to about 20 wt. percent of a dried, granular magnesium silicate clay.

14. An aqueous dispersion formed upon the addition of water to the composition of claim 1, 2, 4, 6, 8, 11, 12 or 13 wherein the water to cementitious binder is from about 1.2 to 2.5 and said dispersion exhibits an increase in viscosity after application of high shear forces to said dispersion.

15. A process of providing a fireproofing and/or acoustical insulation to construction metal infrastructure comprising forming an aqueous dispersion from water and dry components comprising from about 50 to about 90 wt. percent of a hydratable cement, about 3 to 40 vol. percent of a porous aggregate selected from vermiculite, perlite or shredded polystyrene, about 4 to 10 wt. percent of an organic fibrous material, 0 to about 2 wt. percent of an inorganic fibrous material, about 0.05 to 0.5 wt. percent of an air-entraining agent and about 3 to 20 wt. percent of a magnesium silicate clay selected from the group consisting of attapulgite, sepiolite or mixtures thereof having particle size distribution such that at least 60 wt. percent is greater than 44 microns and the average particle size is greater than 72 microns; adjusting the water content to have a water to cement ratio of from about 1.2 to 2.5:1; subjecting the formed dispersion to high shear forces to cause the viscosity of said dispersion to increase; and applying the resultant dispersion to a construction infrastructure.

16. The process of claim 15 wherein the initial dispersion has a density of from about 35 to 55 pounds per cubic foot.

17. The process of claim 15 wherein the high shear force is generated by a piston-pump alone or in combination with the spray applicator.

18. The process of claim 15, 16, or 17 wherein the hydratable cement is gypsum; the aggregate is shredded polystyrene; the organic fibrous material is cellulosic material; and said clay has a water content (as the initial dry component) of less than 16 wt. percent.

* * * * *